March 26, 1968  L. J. SMITH, JR  3,374,559
TEACHING DEVICE
Filed June 28, 1966
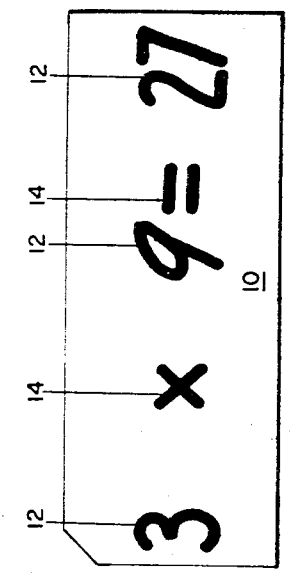
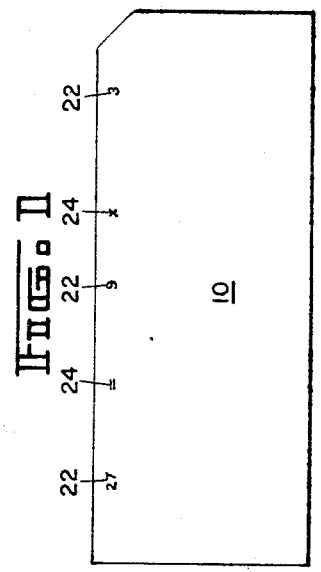
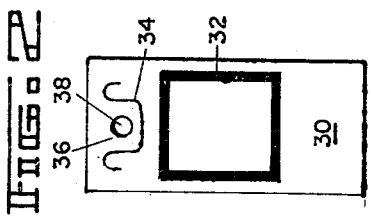
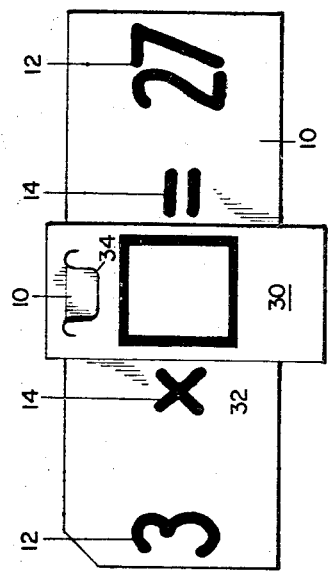
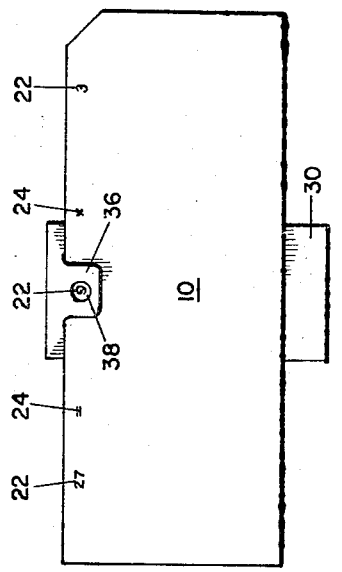
INVENTOR.
LUKE J. SMITH, JR.
BY Kenwood Ross
ATTORNEY.

United States Patent Office 3,374,559
Patented Mar. 26, 1968

3,374,559
TEACHING DEVICE
Luke J. Smith, Jr., East Longmeadow, Mass., assignor to Milton Bradley Company, Springfield, Mass., a corporation of Massachusetts
Filed June 28, 1966, Ser. No. 561,158
2 Claims. (Cl. 35—31)

My invention relates to a teaching device and more particularly to a teaching device of the "flashcard" or "fact card" type wherein information or data pertaining to the subject being taught is carried on one or both faces of a card for display by the teacher in front of a group of students.

A primary object of the invention is to provide means, cooperative with a card of the above-mentioned type, for concealing certain of the data thereon.

Another object is to provide means, cooperative with the card, for immediately indicating to the teacher what data is being concealed.

These and other objects will be apparent from a consideration of the annexed drawing, in which:

FIG. 1 is a view, in top plan, of a flashcard of the type used in practicing the invention;

FIG. 2 is a view, in plan, of the reverse side of the card of FIG. 1;

FIG. 3 is a view, in top plan, of a slide device embodying a preferred form of the invention;

FIG. 4 is a view, in top plan, of the slide device of FIG. 3 in cooperative engagement with the flashcard of FIG. 1; and FIG. 5 is a view, in reverse plan, of the superposed card and slide device of FIG. 4.

With continued reference to the drawing, FIGS. 1 and 2 show a card 10 of the type frequently used in schools for teaching a variety of subjects and commonly known as "flashcards," they being "flashed" by the teacher in rapid succession to the class in drilling exercises.

The cards may be provided in sets for teaching arithmetic, language, history and other subjects.

The card shown, selected for illustrative purposes only, is preferably but not necessarily, generally rectangular in shape and carries numerical indicia 12 and mathematical indicia 14 on one face thereof, indicia 12 and 14 being used to teach arithmetic facts.

In normal use, the card is held up by the teacher with indicia 12 and 14 facing the class.

To enable the teacher to know what arithmetic fact is being presented to the class, the card is provided on its opposite or rear face, adjacent the upper edge thereof, with numerical indicia 22 and mathematical indicia 24 corresponding to indicia 12 and 14 on the front face of the card.

In most teaching situations, especially those dealing with arithmetic facts wherein the various relationships between numbers are being taught, it is desirable that certain of the numerical indicia 12 or mathematical indicia 14 on the front face of the card be concealed in order fairly to determine whether the class and/or individual students understand the arithmetic facts being taught.

To this end, a slide member 30 is provided, said slide member being preferably, but not necessarily, generally rectangular in shape and being provided with indicia 32 on one or both faces thereof, indicia 32 taking the form of symbols or letters indicating that data is to be supplied by the student to complete the arithmetic fact.

The particular indicia 32 shown may take the form of a question mark (?), if so desired.

Slide member 30 is provided, adjacent its upper edge, with a generally U-shaped cut score 34, said cut score defining a tab 36 having a sight opening 38 extending therethrough.

Slide member 30 is used in conjunction with one of the cards 10, in the manner shown in FIGS. 4 and 5, with tab 36 being hooked over the top edge of the card so as to be disposed flush with the rear face of the card, and with the slide member proper being disposed flush with the front face of the card and extending downwardly below the lower edge of the card so that it may conveniently be grasped by the fingers.

The slide member is positioned along the length of the card so as to conceal selected indicia 12 or 14 on the front face thereof.

In order that the teacher may know what data is being concealed, sight opening 38 in tab 36 on the slide member is so positioned as to be registrable with one of the indicia 22 and 24 on the rear face of the card, when tab 36 is hooked over the top edge of the card and the slide member is moved along and relative to said top edge.

In FIG. 4, the slide member proper is shown as concealing the numerical indicia 12 comprising the numeral 9 on the front face of card 10.

FIG. 5 exemplifies the FIG. 4 card and slide member combination as viewed from the rear, it being observed that sight opening 38 in tab 36 is registered with the numerical indicia 22 comprising the numeral 9 provided on the rear face of card 10.

Whatever data is concealed on the front face of card 10 will be revealed to the teacher by means of indicia 22 or 24 appearing through sight opening 38 in tab 36.

While card 10 has been shown as having relatively large indicia 12, 14 only on one face thereof for viewing by the class and relatively small indicia 22, 24 only on the opposite face for viewing by the teacher, it will be understood that both sides of the card may contain both large and small indicia whereby both sides of the card may be used to teach different facts.

For example, the side of card 10 as shown in FIG. 2 may be provided with relatively large indicia to teach the arithmetic fact 27÷9=3 and the side of the card shown in FIG. 1 may be provided with relatively small indicia corresponding thereto.

As previously stated, the concept of the invention is not limited to the teaching of arithmetic facts and could be utilized to teach important dates or events in history, literature and the like.

I claim:
1. A teaching device comprising in combination,
   (a) a flashcard;
   (b) indicia on the flashcard pertaining to a subject with the indicia on the card appearing on both faces thereof and with the indicia on each face being identical in subject matter.
   (c) means slidably related to the flashcard for concealing certain of the indicia thereon and consisting of:
      (a) a slide member cut scored to define a tab;
      (b) the tab having a sight opening therein;
      (c) the tab being engageable with an edge of the flash card with the sight opening therein being registrable with certain of the indicia on one face of the flashcard;

(d) the slide member proper concealing certain indicia on the other face of the flashcard; and (e) the certain indicia on the other face of the flashcard corresponding to the indicia on the one face appearing through the sight opening in the tab.

2. A teaching device according to claim 1 wherein the slide member carries indicia thereon indicating to the one being taught the fact that information is to be supplied by him.

References Cited

UNITED STATES PATENTS

| | | | |
|---|---|---|---|
| 705,579 | 7/1902 | Gibson | 35—31 |
| 3,206,872 | 9/1965 | Nason et al. | 35—31 |

EUGENE R. CAPOZIO, *Primary Examiner.*

W. H. GRIEB, *Examiner.*